UNITED STATES PATENT OFFICE.

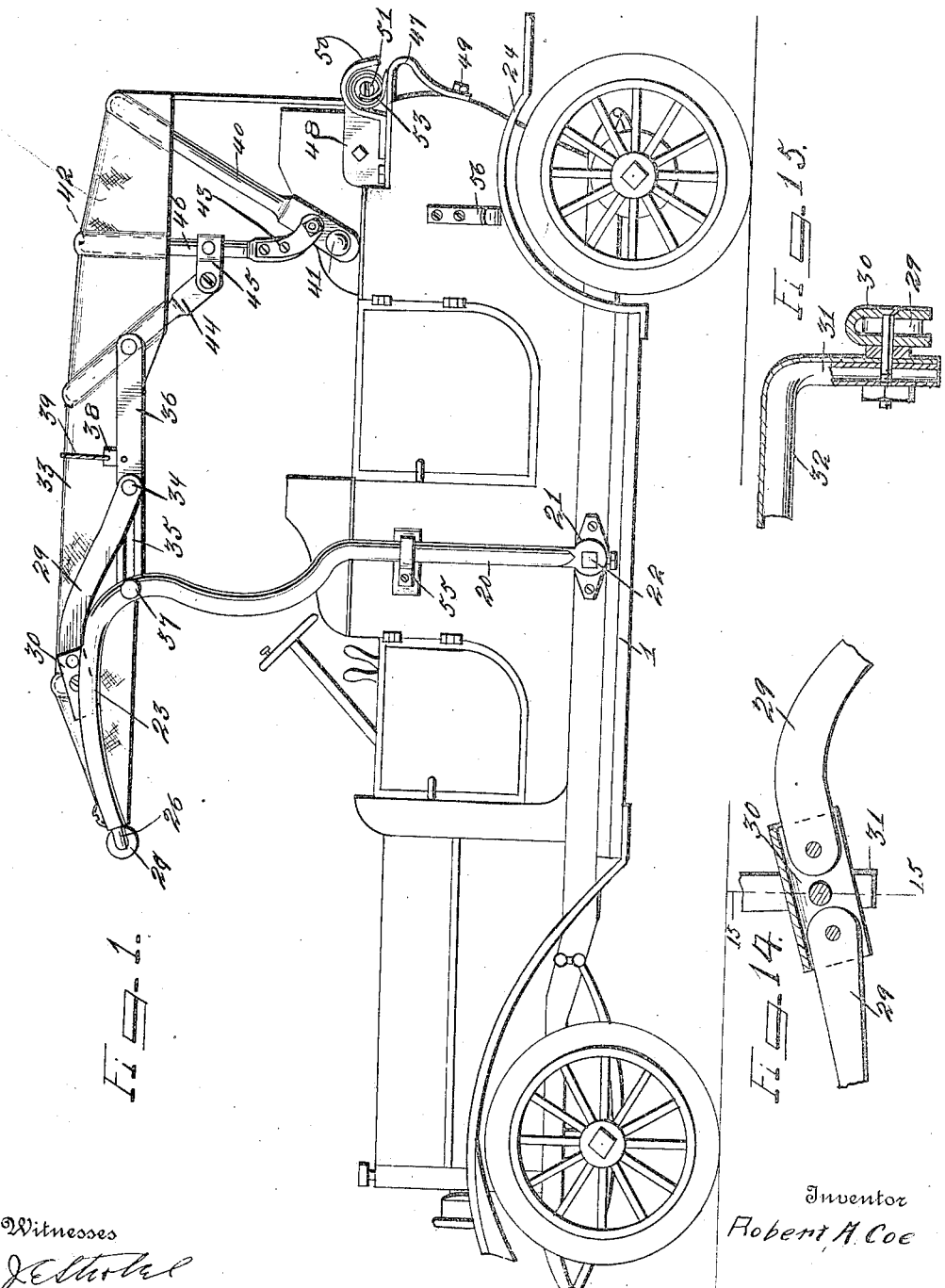

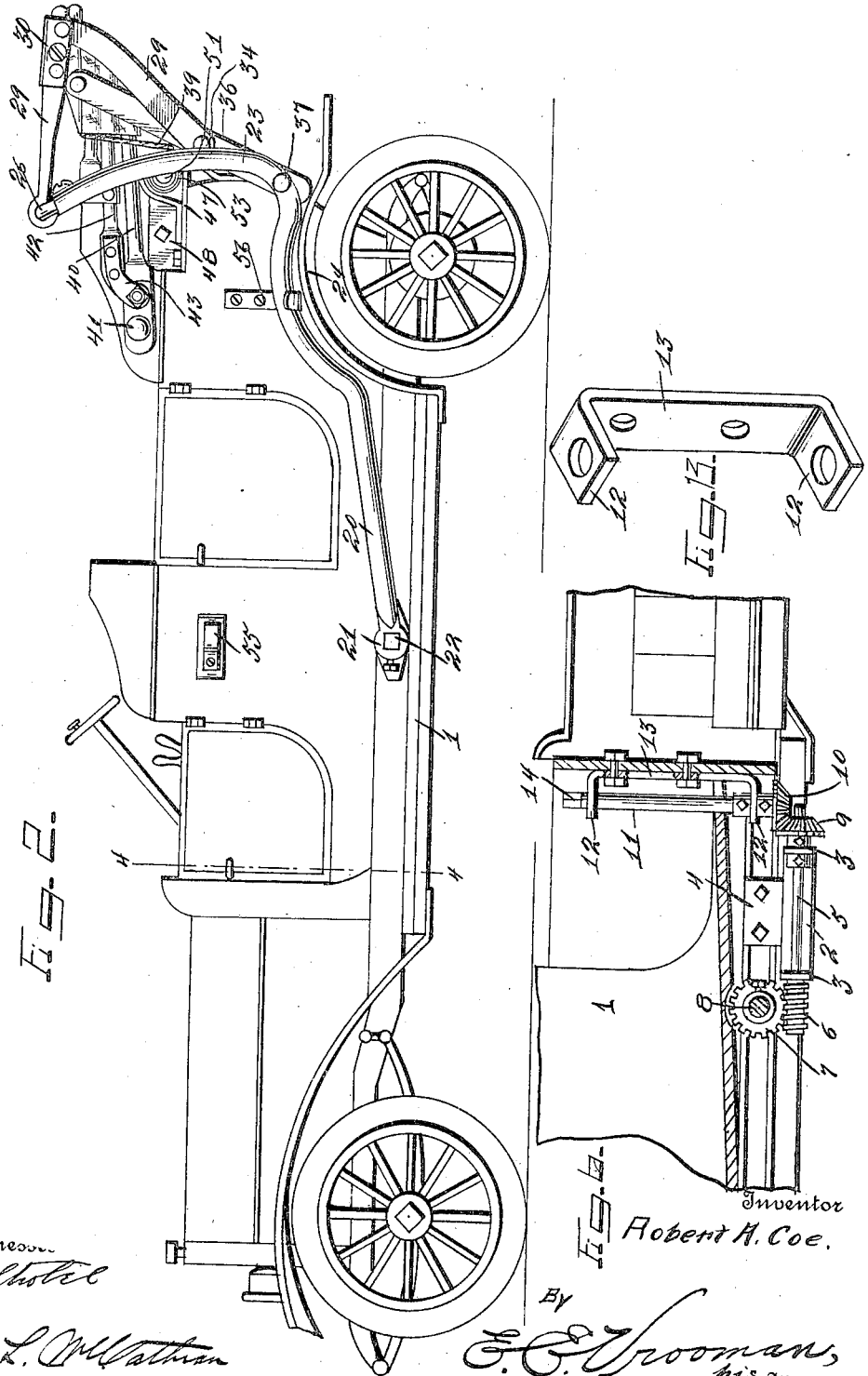

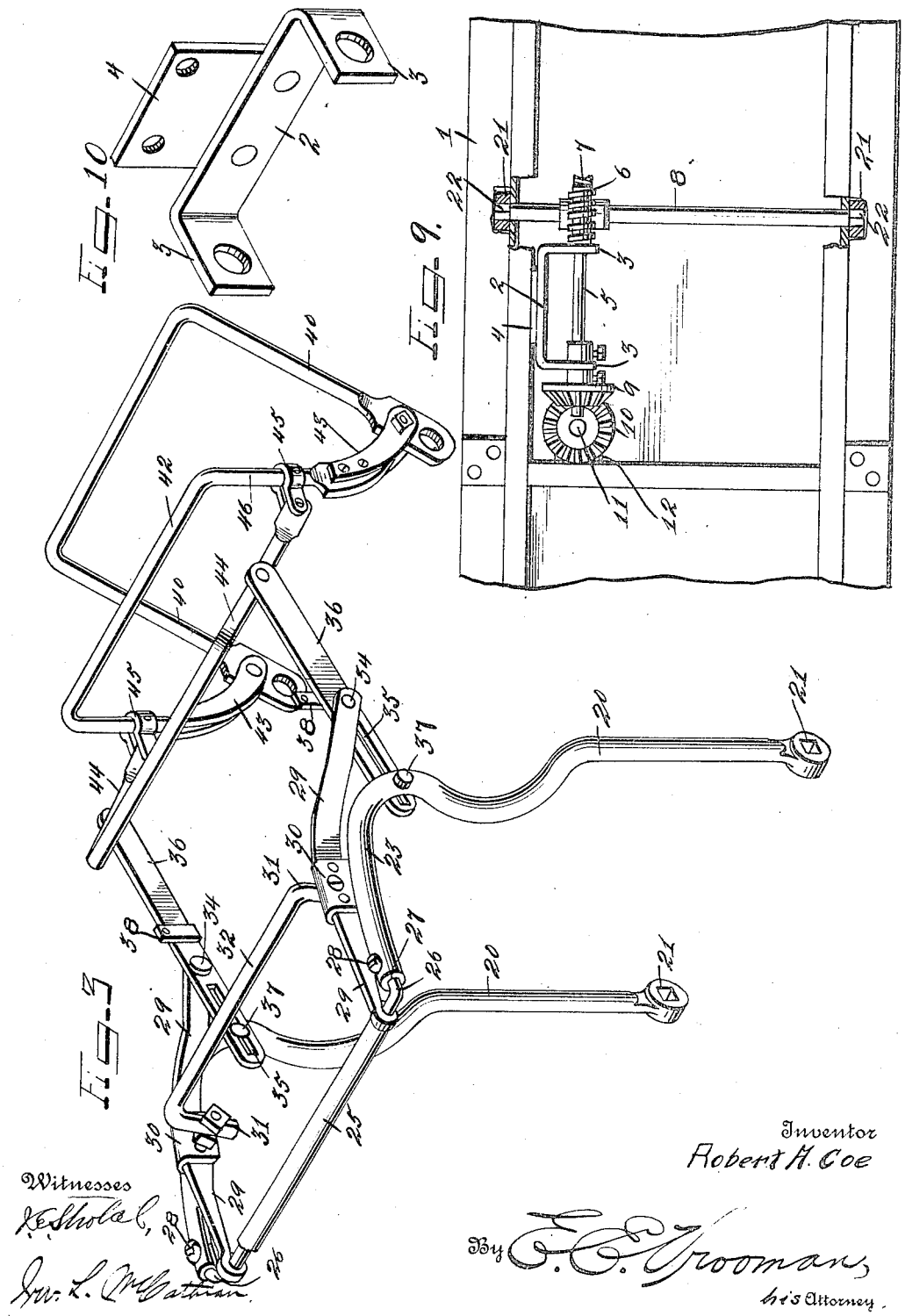

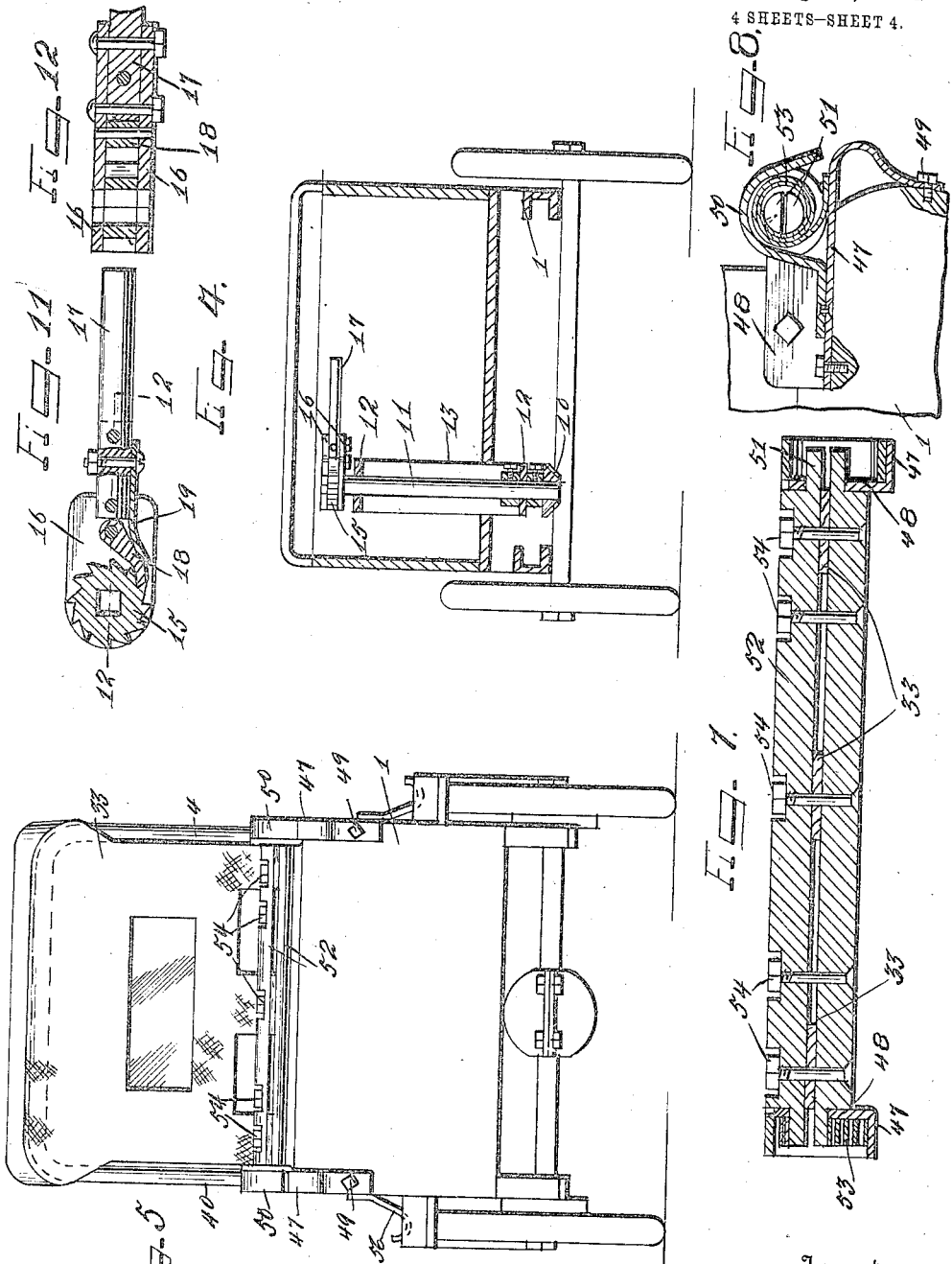

ROBERT A. COE, OF TUPELO, OKLAHOMA.

AUTOMOBILE-TOP.

1,106,784. Specification of Letters Patent. Patented Aug. 11, 1914.

Application filed June 24, 1913. Serial No. 775,582.

*To all whom it may concern:*

Be it known that I, ROBERT A. COE, a citizen of the United States, residing at Tupelo, in the county of Coal and State of Oklahoma, have invented certain new and useful Improvements in Automobile-Tops, of which the following is a specification, reference being had therein to the accompanying drawing.

This invention relates to covers for vehicles and has special reference to an automobile top.

The principal object of the invention is the production of an efficient means for raising and lowering the top by the driver of the machine without the necessity of dismounting from the machine in order to raise or lower the top.

A still further object of the invention is the production of an efficient supporting frame for the cover whereby the cover may be conveniently folded on the rear of the machine and will be out of the way of the user of the machine when the top is in a folded position.

With these and other objects in view, this invention consists of certain novel combinations, constructions and arrangements of parts as will be hereinafter fully described and claimed.

In the accompanying drawings: Figure 1 is a side elevation of the automobile showing the improved top in a raised position. Fig. 2 is a side elevation of an automobile showing the top in a lowered position. Fig. 3 is a detailed perspective view of the frame of the cover for the vehicle. Fig. 4 is a sectional view taken on the line 4—4 of Fig. 2. Fig. 5 is a rear elevation of an automobile showing the improved cover applied thereto. Fig. 6 is a longitudinal section through a portion of the automobile showing the cover raising gear mechanism for raising and lowering the cover upon the body of the vehicle. Fig. 7 is a longitudinal sectional view through the roller upon which a portion of the cover is adapted to be rolled. Fig. 8 is a transverse section through the winding spring of the roller and bracket which supports the same. Fig. 9 is a bottom plan view of a portion of the vehicle. Fig. 10 is a detailed perspective view of the bracket which supports the worm shaft of the operating mechanism. Fig. 11 is a longitudinal section through the rigid lever for operating the raising and lowering mechanism. Fig. 12 is a section taken on line 12—12 of Fig. 11. Fig. 13 is a detailed perspective view of the supporting bracket for the main operating shaft for raising and lowering the cover. Fig. 14 is a longitudinal section through the connecting link which supports the forward bow of the cover frame. Fig. 15 is a section taken on line 15—15 of Fig. 14.

By referring to the accompanying drawings it will be seen that 1 designates the body of the vehicle which may be in the form of either an automobile, carriage or other desired form, and the body 1 of the vehicle carries upon its under face the bracket 2. This bracket 2 comprises a substantially U-shaped body having parallel extending ends 3 and a supporting or anchoring portion 4. The supporting or anchoring portion 4 is secured to the side frames of the vehicle upon the under face thereof, and a worm shaft 5 is carried by the parallel ends 3 of the bracket 2. This worm shaft 5 carries a worm screw 6 at one end, which worm screw meshes with a worm 7 carried by the transversely extending shaft 8. The opposite end of the worm shaft 5 carries a beveled gear 9 which beveled gear 9 meshes with a beveled gear 10 carried by the vertical or main operating shaft 11 passing through the parallel arms 12 of the vertical bracket 13. This vertical bracket 13 is carried by the front of the machine or vehicle in a convenient place whereby the driver of the vehicle may have ready access thereto.

The upper end of the main operating shaft 11 is provided with squared portion 14 over which the operating ratchet 15 fits. This operating ratchet 15 is carried by a head or frame 16 to which head or frame 16 is connected an operating handle 17. The dog 18 is pivotally secured to the head 16 and is engaged by a flat spring 19 carried by the handle 17 for normally holding the dog 18 in engagement with the ratchet. The ratchet 15 is removable from the shaft 11 so that the same may be released for rotating the shaft in opposite directions. It should be understood that as the shaft 11 is rotated, the shaft 8 will also be rotated, thereby controlling the raising and lowering of the cover of the vehicle to be hereinafter described.

The cover for the vehicle is supported upon a framework, which framework comprises a pair of forward primary raising arms 20, which arms are provided with sockets 21, at their lower ends adapted to fit over the squared portion 22 of the transversely extending shaft 8. These arms 20 when in an upright position extend upwardly and have a substantially S-shaped upper end 23 which is so formed for the purpose of fitting snugly over the rear mud guard 24 of the vehicle and by forming the arms 20 in this manner it will be seen that the arms lie out of the way of the user of the machine when the machine is in the forward position, as illustrated in Fig. 2. The extreme upper ends of the arms 20 extend forwardly so as to support the forward cover supporting rod 25, which rod is provided with rearwardly extending ends 26 fitting in the sockets 27 formed in the extreme upper ends of the arms 20 and screws 28 are employed for holding the rearwardly extending ends 26 in firm engagement with the arms 20.

A pair of sectional arms 29 are secured to the forward transversely extending bar 25 of the frame and this sectional arm carries an intermediate substantially U-shaped link 30, which link engages the downwardly extending ends 31 of the forward bow 32. This forward bow constitutes a support for the cover 33 which cover may be formed of any desired rain-proof material. The rear ends of the sectional arms 29 carry laterally extending studs 34 which studs travel in the longitudinally extending slots 35 of the connecting link 36. This connecting link also engages a pin 37 carried by the vertically extending arm 20, and this pin 37 travels in the slot 35 of the link 36 as is illustrated in Figs. 1 and 2. It, of course, should be understood that when the frame is folded to the position shown in Fig. 2, the rear portion of the arms 29 may swing to right-angles to the forward portion of the arms 29 so as to allow the cover frame to be folded snugly back upon the rear of the automobile frame. The links 36 also carry upwardly extending ears 38, which ears engage the straddling cord 39, which cord passes over the top of the cover 33 for retaining a correctly folded cover upon the frame of the vehicle when the same is folded.

The rear bow 40 is pivotally secured upon the rear portion of the frame 1 by means of the pivot pin 41, and an intermediate bow 42 is pivotally connected to the lower ends of the rear bow 40 by means of the parallel strips 43, as is clearly illustrated in Fig. 3. An auxiliary bow 44 is also connected to the intermediate bow 42 by means of the clamping bands 45, as illustrated in Fig. 3, the clamps 45 being secured to the intermediate bow 42 intermediate the ends of the downwardly extending legs 46 thereof. The rear ends of the links 36 are connected to the auxiliary bow 44, as indicated in Figs. 1 and 3 whereby the entire upper frame will be secured together and allow the several bows to fold flatly upon each other when the cover is allowed to drop upon the rear portion of the vehicle 1.

A pair of brackets 47 are secured to the rear of the body 1 of the vehicle, and these brackets are provided with side flanges 48 which assist in holding the brackets in firm engagement with the body, the rear ends of the brackets being bent downwardly and secured to the rear of the frame of the vehicle 1, as indicated at 49. A shield 50 is secured to the bracket 47 and overhangs the projecting ends 51 of the cover roller 52. The projecting ends 51 of the roller 52 are journaled in the upwardly extending flange portions 48 of the bracket 47. A coiled spring 53 has one end secured to one of the projecting ends 51 and the other end secured to the bracket 47 so as to readily wind the cover 33 upon the roller 52 when the cover is being lowered upon the frame of the vehicle 1. The roller 52 preferably comprises a pair of sections held together by means of bolts 54 whereby the cover 33 may be efficiently secured thereto, as is clearly illustrated in Fig. 7.

From the foregoing description it will be seen that a very simple and efficient means has been produced for raising and lowering the cover of the vehicle from the driving seat thereof, without the necessity of dismounting from the vehicle in order to attach the forward supports of the cover of the same. For the purpose of limiting the swinging movement of the arms 20 it will be seen that brackets 55 are carried by the side of the vehicle 1 to limit the swinging movement of the bracket 20 and brackets 56 are secured to the body 1, near the rear thereof for the purpose of supporting the arms 20 when said arms are brought to the position as shown in Fig. 2. When the cover is brought to a folded position, as shown in Fig. 2 it will be seen that the cord 39 will pull tightly across the cover 33 between the auxiliary bow and the forward bow and cause the cover to fold inwardly and prevent the same from becoming bulged or come out of the vehicle.

What is claimed, is:—

1. In a device of the class described the combination with a vehicle, of a plurality of forward arms, said arms provided with forwardly extending ends, a cover frame secured to the forwardly extending ends of said forward arms, a shaft keyed to the lower ends of said arms for swinging said arms forwardly and rearwardly, a worm wheel carried by said shaft, a worm screw engaging said worm wheel, a shaft carrying said worm screw, a beveled gear carried by said last mentioned shaft, a vertical shaft carried by said vehicle and provided with a beveled gear for engaging said last mentioned beveled gear, and means adapted to engage said vertical shaft for operating the same whereby said cover frame may be swung upon said vehicle.

2. In a device of the class described the combination with a vehicle, a plurality of forward arms, an operating shaft supporting said arms, a bow pivotally secured to the rear of said vehicle, an intermediate bow carried by said rear bow, an auxiliary bow carried by said intermediate bow, a plurality of links connecting said auxiliary bow to said forward arms, sectional arms engaging said links, a transversely extending bar connecting the outer ends of said forward arms, said sectional arms engaging said transversely extending bar, a forward bow connected to said sectional arms, and a cover passing over said forward bow and secured to said transversely extending bar carried by said forward arms and also secured to the rear of said vehicle.

In testimony whereof I hereunto affix my signature in presence of two witnesses.

ROBERT A. COE.

Witnesses:
P. STATLER,
W. H. MASSENGALE.